United States Patent Office 3,277,919
Patented Oct. 11, 1966

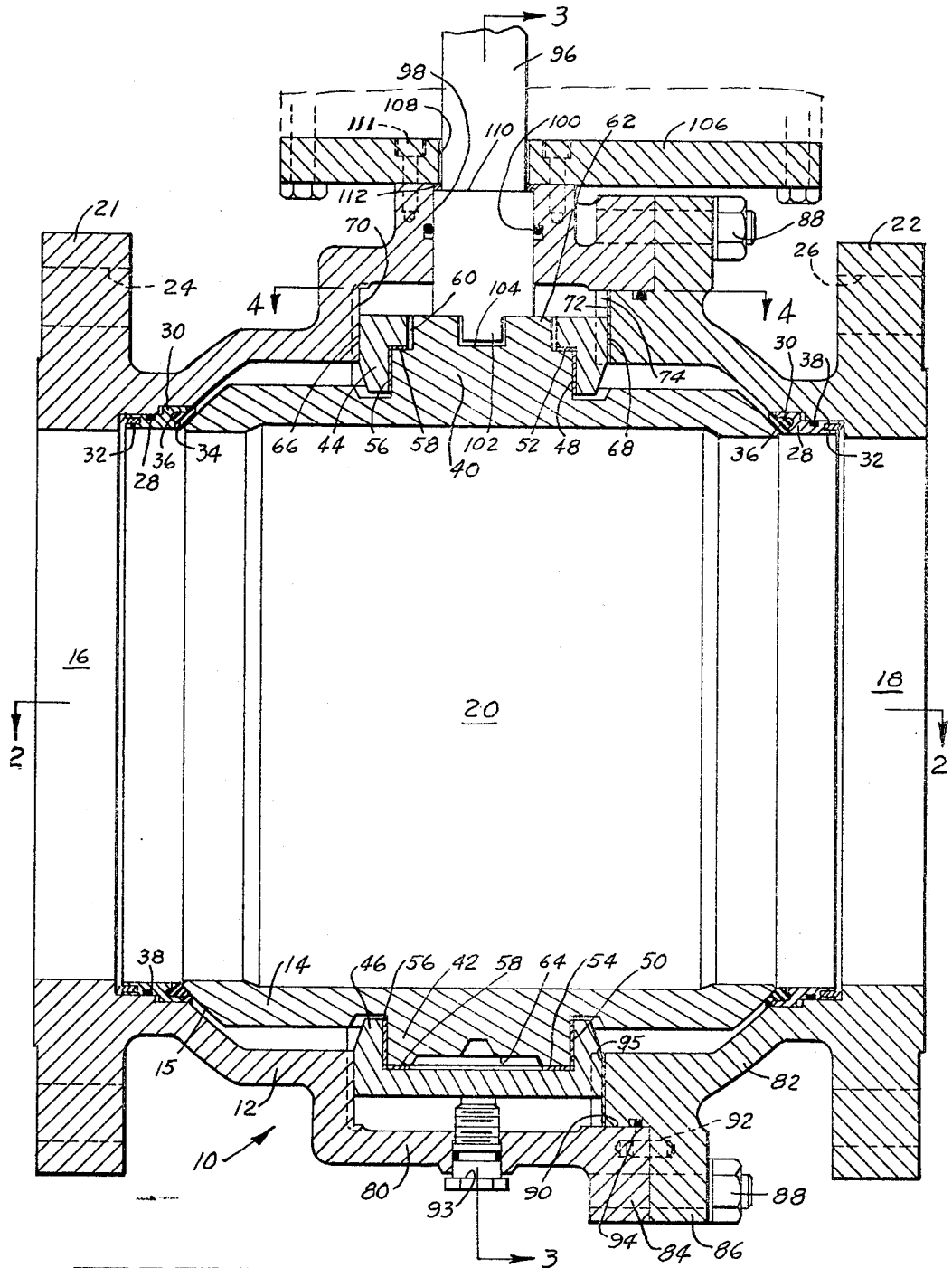

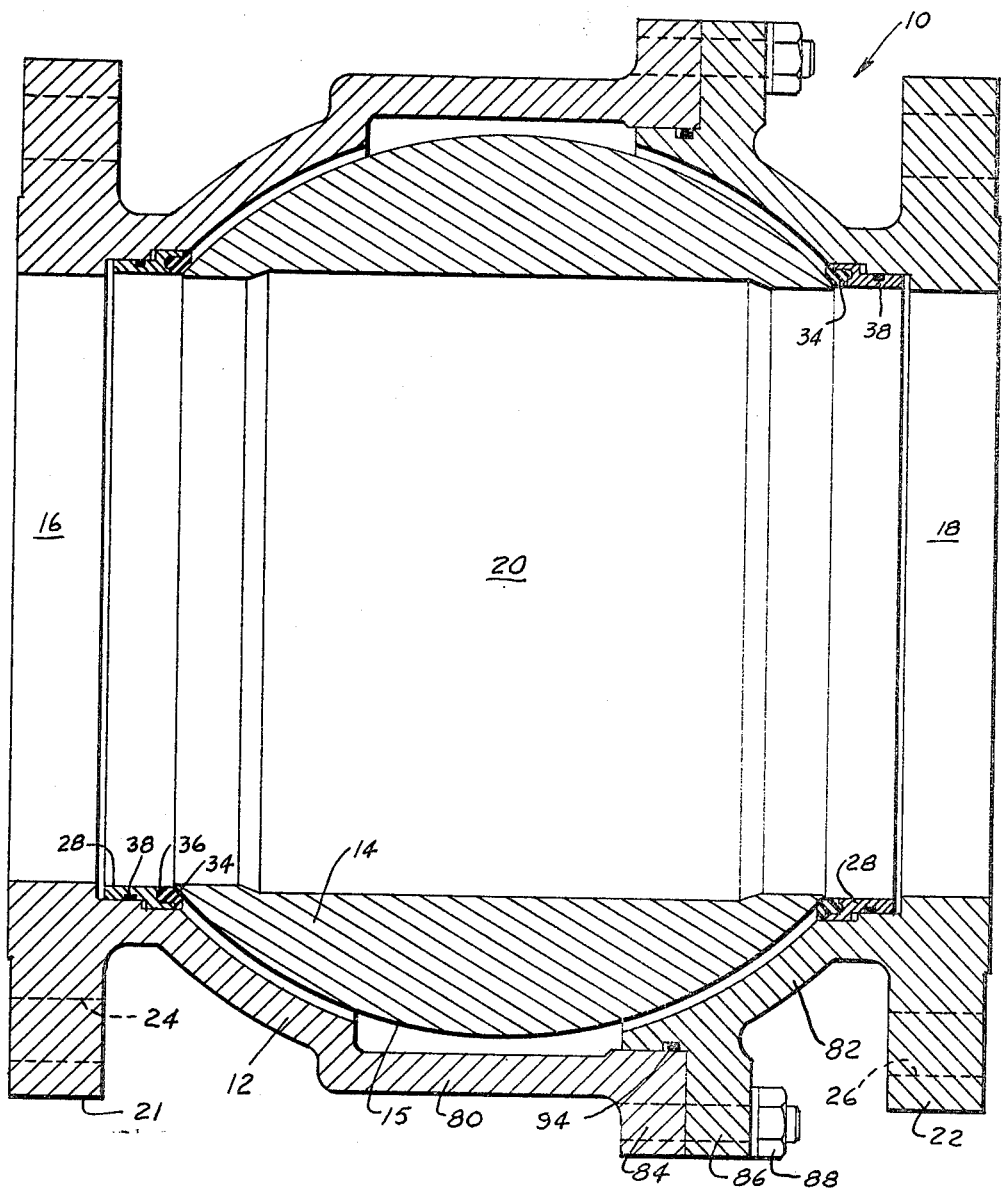
FIG-2-

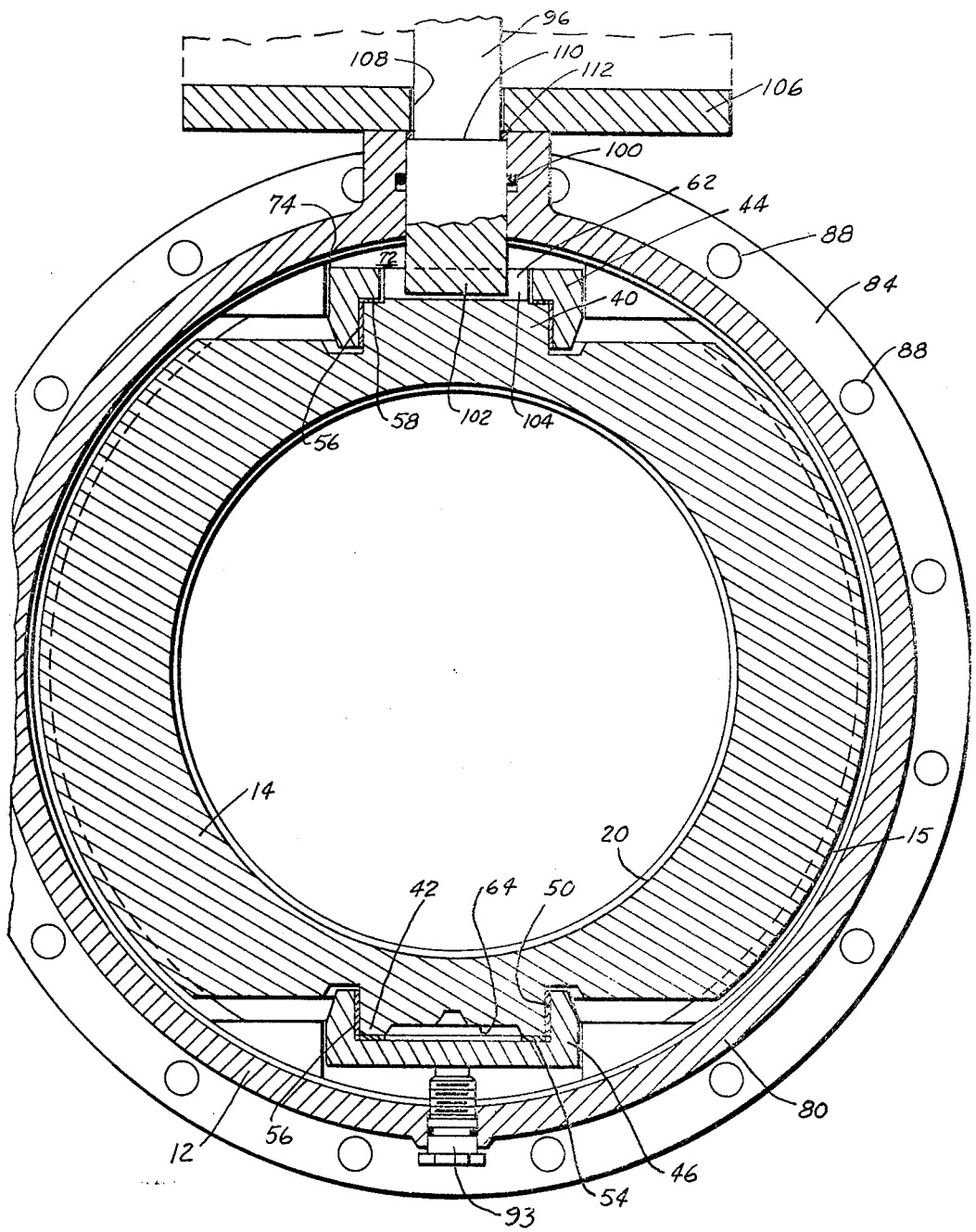
FIG-3-

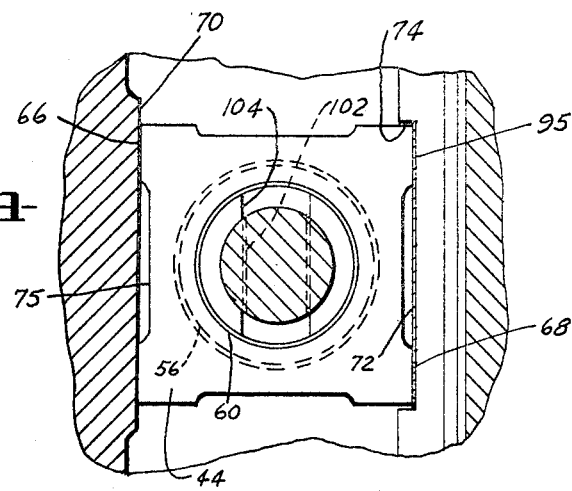
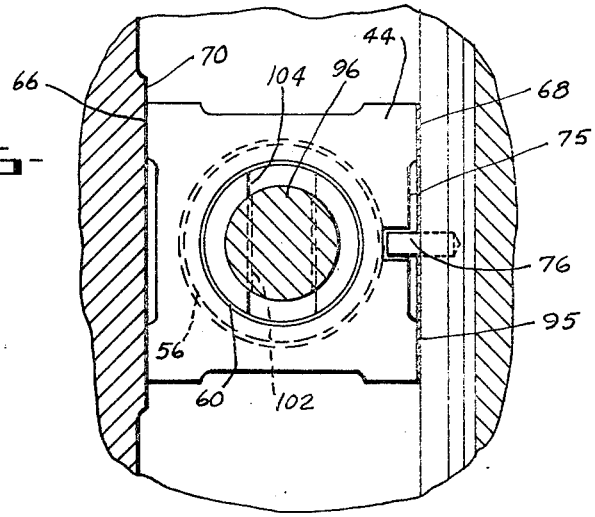

3,277,919
ROTATABLE VALVE STRUCTURE
Jack E. Piccardo, Oakland, Calif., assignor to Grove Valve and Regulator Company, Oakland, Calif., a corporation of California
Filed Oct. 26, 1962, Ser. No. 233,367
16 Claims. (Cl. 137—315)

This invention relates to a rotatable valve structure and, more particularly, to a ball valve that may be assembled and disassembled readily and with minimum tool requirements.

Rotatable valve structures, and particularly ball valves, are generally cumbersome in size and are of multiple-part construction including opposed bonnet assemblies that are secured to the valve bodies and on which are rotatably mounted the ball valve element. Disassembly and assembly of the valve body to replace seals or the ball element itself require considerable effort and time because of the necessity of removing and replacing various body sections, adjusting ball valve bearings and placing and securing the bonnets, panels, etc., that make up the valve body structure.

It is, therefore, an object of this invention to provide a rotatable valve structure that is simple to assemble and disassemble.

It is further an object of this invention to provide a ball valve structure comprising a minimum number of components.

It is further an object of this invention to provide a ball valve structure wherein the bearing members are easily mounted without special attachment to the ball valve body.

A ball valve constructed according to this invention includes a body member made up of two parts which have complementary coupling flanges that may be attached together by means of cap screws or the like. The inner valve member includes opposing journal members over which may be placed bearing blocks that provide the rotatable mounting for the ball. The opening in one of the body sections is sufficiently large to permit free passage of the ball with both bearing blocks mounted on their complementary journal members to place the ball in positions within the body member. The bearing blocks are preferably of square horizontal cross section and flat vertical surfaces in the valve body section provide a positive position stop and key the bearing blocks against rotation in the valve body member. Similar flat surfaces on the other valve body section engage the other side of the bearing blocks when the sections are joined, and inter-engaging portions on the other body section and on the bearing blocks hold them against any lateral movement so that the axis of the journal assemblies are positively determined.

A shaft is slidably mounted in an opening at the upper end of the valve body member and includes a clutch element on the end thereof, so that when the ball valve members are in place, the shaft may be inserted axially to engage the clutch elements and then a retainer plate is positioned to hold the shaft against axial removal. Thus, the means for rotating the valve is complete without requiring special location of the bearing member and the only placement is made through the large openings in the body member sections.

Other objects and advantages of this invention will become apparent from the description following when read in conjunction with the accompanying drawings wherein:

FIG. 1 is a vertical section view of a ball valve embodying features of this invention;

FIG. 2 is a horizontal section view taken along line 2—2 of FIG. 1;

FIG. 3 is a vertical section taken along line 3—3 of FIG. 1;

FIG. 4 is a partial section view taken along line 4—4 of FIG. 1 and showing a bearing assembly; and FIG. 5 is a partial section view showing a modified form of bearing assembly.

Referring now to the drawings in greater detail, the ball valve of this invention 10 comprises the usual valve body 12 and the rotatable ball valve member 14 having a spherical working surface 15. The valve body member 12 includes inlet and outlet flow passages 16 and 18 which may be brought into communication when the ball valve 14 is rotated to align the inlet and outlet ports 16 and 18 with a flow passage 20 bored through the ball 14. The ports 16 and 18 are surrounded at the valve body extremities by coupling means for connecting the valve body 12 in a pipeline (not shown). In the valve illustrated, the coupling means comprise pipe flanges 21 and 22, each having bolt holes 24 and 26 through which bolts may be extended to secure the flanges to complementary flanges on pipeline couplings in the customary manner.

The valve body 12 also includes suitable seal means which cooperate with the spherical working surface 15 of the ball valve member to seal off fluid flow when the valve is in the closed position. Such seal means may comprise similar seat rings 28, slidable in an enlarged counter bore 30 in the valve body 12 and urged by spring means 32 toward the ball valve member 14. A resilient seal member 34 of rubber, plastic or the like may be molded into a suitable recess 36 in the seat ring to provide a unitary sealing structure. An annular seal 38 of the O-ring type preferably seals against fluid flow around the seat ring 28.

The valve, thus far generally described is of more or less conventional structure and a particular feature of this invention resides in the specific structure now to be described. The inner member or ball valve 14 is rotatable selectively to bring the spherical working surface 15 or the flow passage 20 into alignment with the flow passages 16 and 18, by means of short journal members 40 and 42 formed integral with the ball 14 in coaxial alignment at the top and bottom thereof. Rotatably engaged on the journal elements 40 and 42 are bearing blocks 44 and 46 having rotational bearing surfaces 48 and 50, respectively, which rotatably engage the journal elements 40 and 42. In the design of different size valves for a set of pressure operating conditions, the relationship of journal diameter to ball diameter is a constant. The ball diameter is usually governed by the size of the bore therethrough and, therefore, the journal diameter may be determined from the constant ratio.

Each of the bearing blocks 44 and 46 also includes an annular thrust bearing portion 52 and 54 and which prevent axial displacement of the ball valve member 14. Rotary bearing sleeves 56 and thrust bearing rings 58 of nylon, Teflon or a suitable bearing metal are preferably provided to minimize friction between the journal elements and their respective bearing blocks. While the bearing members 40 and 42 are shown as the male members in bearing assemblies, it is to be understood that the element may be reversed in this respect. It is only necessary that an opening 60 be provided in the upper bearing block 44 to expose a coupling portion 62 of the upper journal member for a purpose hereinafter to be described. The lower journal element is preferably relieved at 64 in order to minimize frictional contact.

The bearing blocks 44 and 46 are preferably, generally square in horizontal cross section and are held against rotation in valve body member 12 by firm clamping engagement of the flat opposite surfaces 66 and 68 (FIGS. 1 and 4) with complementary flat surfaces 70 and 72 on the valve body member. In addition, the flat restraining surface 72 comprises the recessed wall of a rectangular recess including side walls 74 which embrace the square bearing blocks 44 and 46 both to hold it against rotation and to maintain its axial alignment.

An alternate form of axial locating device is shown in FIG. 5 wherein the recess walls 74 are replaced by a locating pin 76 extending from the wall 72 to engage a complementary recess in the bearing blocks 44, 46.

Preferably, as shown in FIGS. 4 and 5, the mid-portions of the bearing block clamping surfaces 66 and 68 are recessed at 75 so that clamping forces exerted by the flat body member surfaces 70 and 72 are directed along lines which are spaced radially outward of the shaft 96. Thus any tendency to squeeze the bearing against the journal, and possibly bind these elements, is obviated.

The assembly of the valve described is facilitated greatly by the construction of a valve body member 12 wherein it is formed in two sections 80 and 82 having complementary, annular coupling flanges 84 and 86 which in assembly are secured firmly together by cap screws 88 or the like, angular alignment of the coupling flanges being first determined positively by an interconnecting pin 92 extending between recesses in the flanges 84 and 86. The flange 84 of the valve body section 80 surrounds a circular opening 90 of a diameter large enough to permit the ball valve member 14 together with the bearing blocks 44 and 46 mounted on its corresponding journal elements 40 and 42 to be inserted and removed freely. Thus, with the valve body section 82 removed a ball valve member 14 and the elements necessary to render it rotatable in the valve body 12 may be inserted through the opening 90 and positioned with the bearing block held against restraining surfaces 70. Then, the mating valve body section 82 may be positioned by alignment of the pin 92 and cap screws fastened to secure the couplings 84 and 86 firmly together. The opposite restraining surfaces 72 are carried on an annular axial flange which seats within the opening 90 to close the opening firmly. With the valve element 14 and the bearing assembly in place, their axial disposition may be determined positively by threading an adjustment screw 93 which engages the bottom of bearing block 46. An O-ring seal or the like 94 is provided to seal against leakage. Thus, connection of a single flange coupling 84, 86 results in assembly of a substantially complete valve.

This invention also contemplates the provision of a shim 95 of compressible material such as a suitable plastic or metal. The shim is designed to accommodate machining tolerances so that the bearing blocks will be clamped tightly when the flanges 84 and 86 are brought into full contact (FIGS. 4 and 5).

The valve operating means comprises a shaft 96 which is rotatable and slidable in a suitable bore 98 in one of the valve body sections 80 and sealed against leakage by an O-ring or the like 100. It will be apparent that when the ball element 14 is placed within the valve body 12 and the flange coupling 84, 86 completed, the shaft 96 may be inserted axially into the bore 98 until male clutch element 102 engages in a complementary slot 104 in the exposed portion 62 of the upper bearing element 40. With the engagement thus completed, rotation of the shaft 96 manually or mechanically by suitable means (not shown) results in rotation and, hence, operation of the ball valve element 14. When shaft clutch coupling 102, 104 is completed a retainer plate 106 having a bore 108 freely to accommodate the reduced diameter, upper portion of the shaft 96 is secured onto the valve body. The plate 106 is shown of large area because it preferably accommodates valve operating mechanism (not shown). However, for purposes of this invention it could be just large enough to cover the opening 98. In any event, the plate 106, when secured onto the valve body 12 by cap screws 111, prevents dis-engagement of the clutch. The shoulder 110 formed on the shaft 96 by the reduced diameter upper portion bears against a thrust washer 112 held in place by the retaining plate member 106.

If it is desired to disassemble the valve 10, as for the purpose of replacing the seat rings 28, the cap screws 111 are loosened to remove the retainer plate 106 so that the operating shaft 96 and the shaft clutch elements 102, 104 may be disengaged. Then, the cap screws 88 are removed to separate the flange couplings 84, 86 joining the valve body sections 80 and 82. Now the ball valve element 14 with bearing blocks 44 and 46 engaged thereon is removed through the opening 90. With the valve element thus separated the seat rings 28 in each valve body section may be inspected and repaired or replaced. After the seat rings are again in place, the ball element is replaced in the body section 80 until the flat surfaces 66 of the bearing blocks 44 and 46 engage the surfaces 70. Then the other body section 82 is placed as determined by aligning pin 92 and firmly secured by tightening cap screws 88 whereby the bearing blocks are held firmly against rotation. Finally, the operating shaft is inserted axially and rotated until the clutch elements 102, 104 are engaged, and the retainer plate is secured to the valve body 12.

While this invention has been described with specific reference to a ball valve element it is to be understood that it applies with equal efficacy to other valve type structures which are operated rotatably. This would include butterfly valves and even structures of the ball valve type which are employed for the purpose of introducing test objects, for example, into a pipe line. In such structures the through passageway 20 in the ball is replaced by a pocket into which the object is placed and the ball rotated to expose the object to line fluid flow.

It is to be understood further that other modification and changes in the structure here disclosed may be made by those skilled in the art without departing from the spirit and scope of this invention which is defined by the claims appended hereto.

What is claimed as invention is:

1. A structure of the rotatable valve type comprising:
   a rotatable inner valving member,
   first and second journal elements on said inner member,
   first and second bearing members rotatably receiving said first and second journal elements, respectively,
   complementary rotary bearing surfaces and separate complementary thrust bearing surfaces on said bearing members and said journal elements,
   a first valve body section having an opening therein large enough to receive said inner member with said bearing members engaged on said journal elements,
   a second complementary valve body section,
   releasable means for securing said first and second valve body sections together, and
   means on at least one of said body sections for clamping said bearing members against both rotary and axial movement therein when said body sections are secured together.

2. The structure defined in claim 1 including:
   a shaft extending out through one of said valve body sections and rotatable therein, and
   clutch means for connecting said shaft to one of said journal elements.

3. A structure of the rotatable valve type comprising:
   a rotatable inner valving member,
   first and second journal elements on said inner member,
   first and second bearing members rotatably receiving said first and second journal elements, respectively,
   complementary rotary bearing surfaces and separate complementary thrust bearing surfaces on said bearing members and said journal elements, a first valve body section having an opening therein large enough to permit passage therethrough of said inner member with said bearing members engaged on said journal elements, a coupling element around said opening, a second valve body section, a complementary coupling element on said second valve body section, releasable means securing said coupling elements together, and means on at least one of said body sections for clamping said bearing members against both rotation and axial movement therein so that said inner member is rotatable within said body sections.

4. The structure defined in claim 3 including:
a shaft slidable axially and rotatably in one of said body sections, and
clutch means connecting said shaft to one of said journal elements,
said clutch means being releasable by axial separation of said shaft from said one journal element.

5. The structure defined in claim 4 including:
releasable means holding said shaft against axial movement while said clutch means is engaged.

6. The structure defined in claim 3 wherein each of said bearing members has at least one flat outer surface parallel to the axis of said bearing member, and
at least one of said body sections has flat inner surfaces engaging the flat outer surfaces of said bearing members when said coupling elements are secured together, and including means on the other of said body sections forcing said bearing members toward said inner surfaces so that said inner and outer surfaces are in firm clamping engagement.

7. The structure defined by claim 6 wherein:
one of said inner and outer surfaces in each complementary pair thereof is interrupted over a portion thereof in alignment with said journal element.

8. The structure defined in claim 6 wherein:
the mid-portions of said outer surfaces are recessed across the full width thereof in the direction of the axis of said journal elements.

9. A structure of the rotatable valve type comprising:
a valve body member having inlet and outlet flow ports,
an inner valving member rotatable in said body member into and out of alignment with said flow ports,
first and second opposite coaxial journal elements on said inner member,
first and second bearing blocks in said body member rotatably receiving said first and second journal elements, respectively,
complementary rotary bearing surfaces and separate complementary thrust bearing surfaces on said bearing blocks and said journal elements,
flat outer surfaces on said bearing blocks,
said valve body member including:
a first valve body section having an opening therein large enough to permit free passage therethrough of said inner member with said bearing blocks engaged on said journal elements,
a coupling flange around said opening,
a second valve body section,
a complementary coupling flange on said second valve body section,
releasable means securing said coupling flanges together,
flat inner surfaces on said body sections engaging the outer surfaces of said bearing blocks to clamp said bearing blocks against movement so that said inner member is rotatable in said body member,
a shaft slidable axially and rotatably in said valve body member,
clutch means connecting said shaft to one of said journal elements for rotation therewith,
said clutch means being releasable by axial separation of said shaft from said one journal element, and
releasable means on said valve body member holding said shaft against axial movement while said clutch means is engaged.

10. The structure defined in claim 9 wherein:
the mid-portions of said outer surfaces are recessed across the full width thereof in the direction of the axis of said journal elements.

11. The structure defined in claim 10 including:
a shim of compressible material between an engaging pair of said inner and outer surfaces.

12. The structure defined in claim 10 including:
means carried in one of said body sections and movable therein in a direction parallel to the axis of said journal elements when said bearing blocks are not clamped against movement to engage and to locate axially one of said bearing blocks.

13. A ball valve structure comprising:
a valve body member having inlet and outlet flow ports,
a ball valve member rotatable in said body member and having an imperforate working surface moveable into and out of alignment with said flow ports,
first and second opposing coaxial journal elements on said inner member,
first and second bearing blocks in said valve body member rotatably receiving said first and second journal elements, respectively,
complementary rotary bearing surfaces and separate complementary thrust bearing surfaces on said bearing blocks and said journal elements,
a pair of parallel flat outer surfaces on said bearing blocks,
said valve body member including:
a first valve body section having an opening therein large enough to permit free passage therethrough of said ball valve member with said bearing blocks engaged on said journal elements,
a coupling flange around said opening,
a second valve body section,
a complementary coupling flange on said second valve body section,
releasable means securing said coupling flanges together,
parallel flat inner surfaces on said body sections engaging said outer surfaces on said bearing blocks to clamp them against movement so that said ball valve member is rotatable in said body member,
a shaft slidable axially and rotatably in said valve body member,
clutch means connecting said shaft to one of said journal elements for rotation therewith,
said clutch means being releasable by axial separation of said shaft from said one journal element, and
releasable means on said valve body member holding said shaft against axial movement while said clutch means is engaged.

14. The ball valve structure defined in claim 13 wherein:
the mid-portions of said outer surfaces are recessed out of engagement with said inner surfaces across the full width of said outer surfaces in the direction parallel to the axis of the journal elements.

15. The structure defined by claim 1 including:
means carried in one of said body sections and movable therein in a direction parallel to the axis of said journal elements when said bearing members are not clamped against movement to engage and to locate axially one of said bearing members.

16. The structure defined by claim 3 including:
means carried in one of said body sections and movable therein in a direction parallel to the axis of said journal elements when said bearing members are not clamped against movement to engage and to locate axially one of said bearing members.

References Cited by the Examiner

UNITED STATES PATENTS

| | | | |
|---|---|---|---|
| 2,932,311 | 4/1960 | Scherer | 251—315 X |
| 3,006,598 | 10/1961 | Carr | 251—306 X |
| 3,036,590 | 5/1962 | Knox | 137—315 |
| 3,101,740 | 8/1963 | Ray | 251—315 X |

WILLIAM F. O'DEA, *Primary Examiner.*

ISADOR WEIL, *Examiner.*

R. GERARD, *Assistant Examiner.*